(No Model.)

S. L. BAILEY.
FLUID CONDUIT.

No. 388,616. Patented Aug. 28, 1888.

WITNESSES:
Fred. A. Lovejoy
Charles H. Fisher

INVENTOR:
Squire Lafayette Bailey

UNITED STATES PATENT OFFICE.

SQUIRE LAFAYETTE BAILEY, OF LOWELL, MASSACHUSETTS.

FLUID-CONDUIT.

SPECIFICATION forming part of Letters Patent No. 388,616, dated August 28, 1888.

Application filed February 20, 1888. Serial No. 264,633. (No model.)

*To all whom it may concern:*

Be it known that I, SQUIRE LAFAYETTE BAILEY, a citizen of the United States, residing at Lowell, in the county of Middlesex and Commonwealth of Massachusetts, have invented a new and useful Improvement in Fluid-Conduits, of which the following is a specification.

My invention relates especially to a pipe-fitting for use in joining the ends of different pieces of pipe in order to make up a fluid-conduit of considerable length, and it is used to join the ends of said pieces in such a way that each of said pieces of pipe may be readily cleansed by running a suitable article—such as a wire or a stick—through it.

My invention is illustrated in the accompanying drawings, in which—

Figure 4:
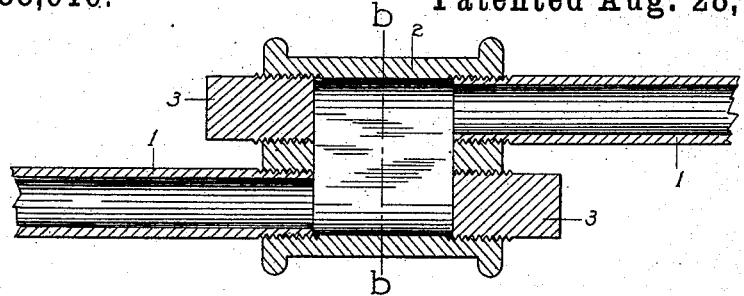
Figure 3:
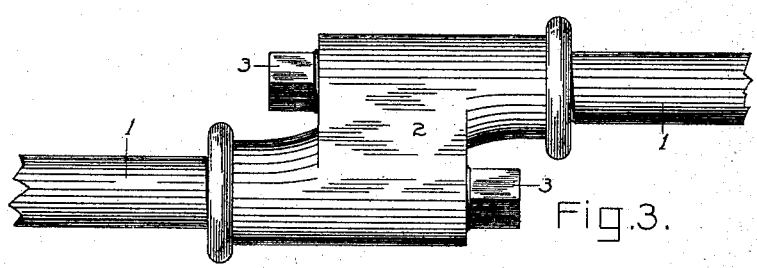
Figure 2:
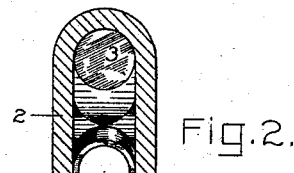
Figure 1:
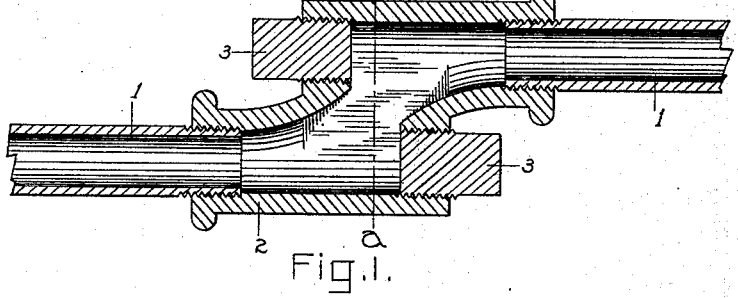

Figure 1 is a longitudinal section of a pipe-fitting and portions of the pipes joined thereby, together with plugs, serving to close the mud-holes in said fitting. Fig. 2 is a sectional elevation seen when looking toward the left at the line $a\ a$ of Fig. 1. Fig. 3 is an elevation of the device illustrated in Fig. 1, and Fig. 4 is a longitudinal section of a modified form of the device shown in Fig. 1.

Similar reference-numbers refer to similar parts in all of the views.

In the drawings, the pipes 1 are shown entering and secured to the coupling 2, the axes of said pipes not coinciding, as usual, but being offset from each other a considerable amount, although still substantially parallel. In the coupling 2 are also formed mud-holes opposite the ends of the pipes, and which, when the coupling is in use, are closed by the plugs 3 or equivalent means.

In order to clean out the pipes 1 it is only necessary to remove the plugs 3 and run a wire or other cleaning device directly through the holes that had been closed by said plugs and through said pipes, and thereby remove any obstruction which might be in said pipes, said mud-holes being placed substantially in a continuation of the pipes 1 for that purpose.

The improved coupling may be made in any one of several different forms, two of such forms being illustrated in the drawings. Of these two forms I think the one shown in Figs. 1 and 3 is the better one, because of the fact that the changes of direction made by a fluid passing through the pipes when that form is used are less abrupt than when the form shown in Fig. 4 is used. Nevertheless, the form shown in Fig. 4 is a very good one for use in some cases. The section at the line $b\ b$ is preferably an oval one, substantially similar to that shown by the section-lines in Fig. 2. The pipes 1 are shown as being secured to the coupling 2 by being screwed therein, said pipes having their ends screw threaded for that purpose, as are also the devices 3, which serve as mud-hole stoppers; but any usual and equivalent means of securing said pipes to the coupling and of closing the mud-holes opposite the ends of the pipes 1 (shown as closed by the screw-threaded plugs 3) may be adopted when it is desirable to do so.

A fluid-conduit of great length may be made by taking a number of lengths of ordinary pipe and connecting their ends with the coupling herein described, and such a conduit may be easily cleaned throughout its whole length by removing the mud-hole stoppers and running cleaning devices through the pipes.

My invention is intended mainly for use upon service-pipes leading from street water-mains to and within buildings in places where the water supplied is known or suspected to corrode lead pipes, thus rendering the water poisonous. By the use of my improved coupling such service-pipes may be made of iron. It is well known that iron pipes soon become obstructed by oxide of iron under such circumstances, and by using my invention they may be easily and periodically cleared by running a stiff rod provided with a scraper through each section of pipe. As such service-pipes are often very small, some being provided with a bore less than one-fourth of an inch in diameter, it becomes very desirable to provide, as I have done, for the insertion of a rod as large as will readily pass through the pipe, especially as the largest possible rod that can be used will be none too strong in such cases, since the resistance offered by a deposit of oxide is very considerable. No scraper will usually be necessary upon the rod in the case of very small pipes.

What I claim as new, and desire to secure by Letters Patent, is—

1. A pipe-coupling having at its opposite ends screw-threaded pipe-receiving openings offset from each other, and a single unobstructed chamber forming a communication between said openings, said coupling having also a mud-hole at each end directly opposite or in line with said pipe-receiving openings and adapted to be closed by removable stoppers or plugs, substantially as set forth.

2. A pipe-coupling having at its opposite ends screw-threaded pipe-receiving openings offset from each other, and a single unobstructed chamber forming a communication between said openings, said coupling having also a mud-hole at each end directly opposite or in line with said pipe-openings, combined with two pipes screwed into said pipe-openings and with two removable stoppers or plugs closing said mud-holes, substantially as set forth.

SQUIRE LAFAYETTE BAILEY.

Witnesses:
FRED. A. LOVEJOY,
CHARLES H. FISHER.